(12) United States Patent
Nishikawa

(10) Patent No.: US 8,953,709 B2
(45) Date of Patent: Feb. 10, 2015

(54) COMMUNICATION DEVICE AND COMMUNICATION METHOD

(71) Applicant: Icom Incorporated, Osaka (JP)

(72) Inventor: Nobuyoshi Nishikawa, Osaka (JP)

(73) Assignee: Icom Incorporated, Osaka (JP)

( * ) Notice: Subject to any disclaimer, the term of this patent is extended or adjusted under 35 U.S.C. 154(b) by 125 days.

(21) Appl. No.: 13/848,153

(22) Filed: Mar. 21, 2013

(65) Prior Publication Data

US 2013/0251056 A1    Sep. 26, 2013

(30) Foreign Application Priority Data

Mar. 26, 2012    (JP) ................. 2012-070406

(51) Int. Cl.
*H04L 25/03* (2006.01)
*H04L 27/26* (2006.01)

(52) U.S. Cl.
CPC .......... *H04L 27/2628* (2013.01); *H04L 27/265* (2013.01); *H04L 27/2614* (2013.01); *H04L 27/2626* (2013.01); *H04L 27/2647* (2013.01)
USPC ....................................... 375/296

(58) Field of Classification Search
USPC .......... 375/259, 260, 295–297; 370/203, 206, 370/210
See application file for complete search history.

(56) References Cited

U.S. PATENT DOCUMENTS 7,627,046 B1 *  12/2009  Dick et al. ............. 375/260
8,817,906 B2 *  8/2014   Nishikawa ............. 375/267

FOREIGN PATENT DOCUMENTS

JP    2006-165781    6/2006

* cited by examiner

*Primary Examiner* — Tesfaldet Bocure
(74) *Attorney, Agent, or Firm* — Warner Norcross & Judd LLP

(57) ABSTRACT

A modulator generates a subcarrier modulation signal from an input signal, a parallel-serial converter generates a subcarrier modulation signal from the modulation signal. An IFFT calculator performs reverse Fast Fourier Transform on the subcarrier modulation signal, and a separator separates a calculation result into real part data and imaginary part data. A real part calculator performs a calculation on each element of the real part data to generate real part post-distribution data. An imaginary part calculator performs the data processing on the imaginary part data in the same manner, and generates imaginary part post-distribution data. A combiner combines the real part post-distribution data and the imaginary part post-distribution data to generate a baseband signal, and a transmitter which generates a transmission signal from the baseband signal to transmit generated transmission signal.

12 Claims, 8 Drawing Sheets

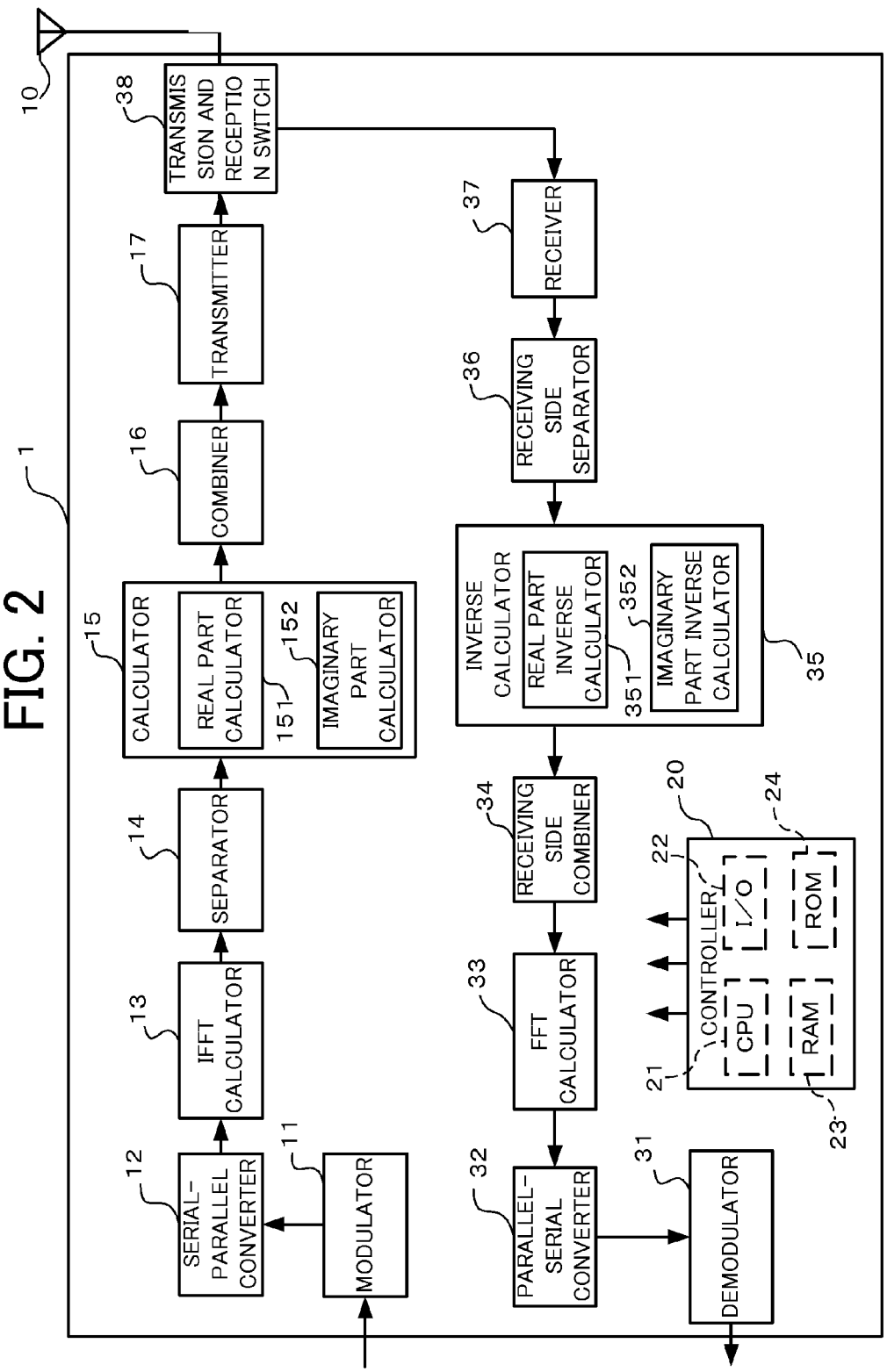

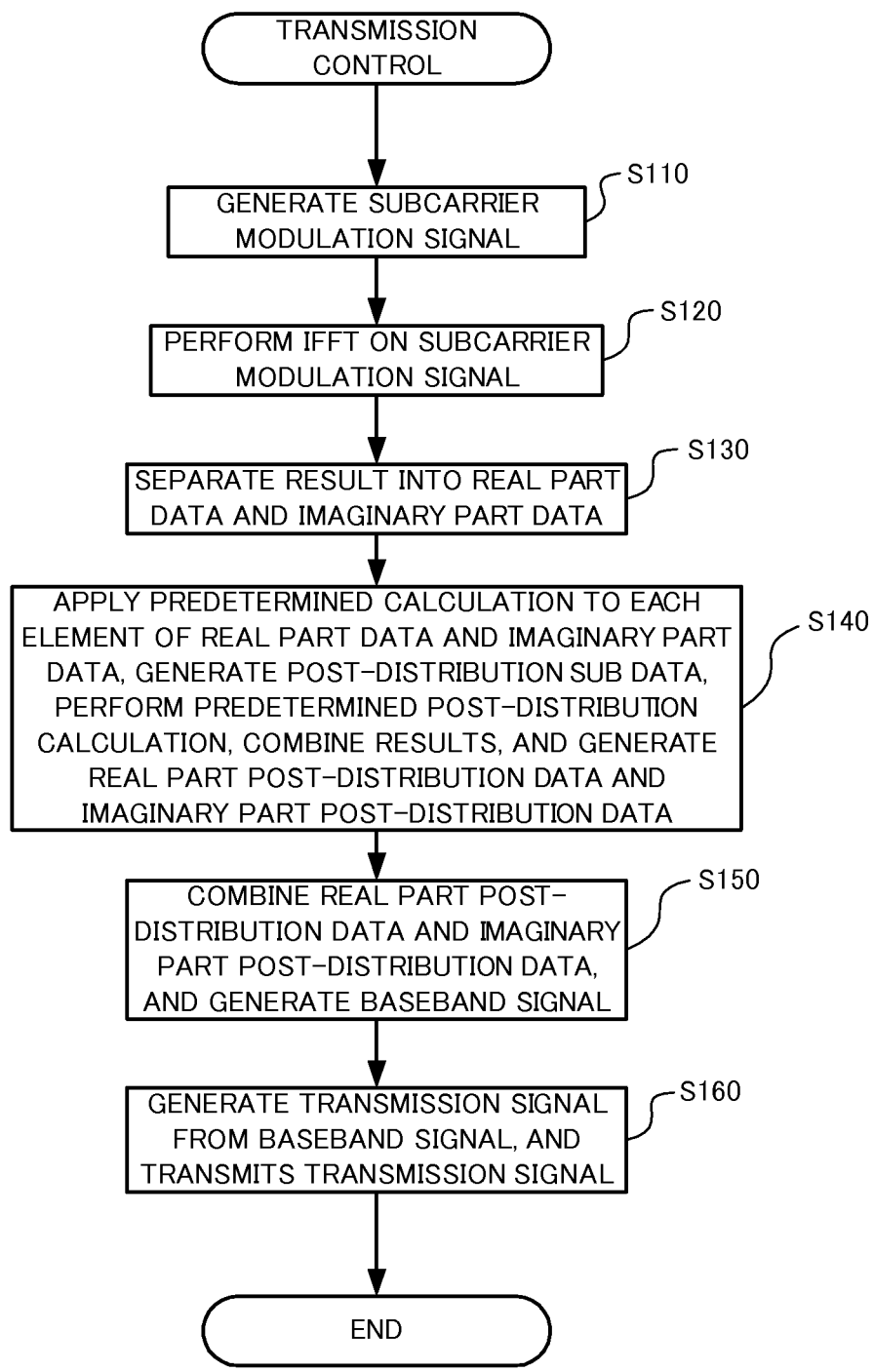

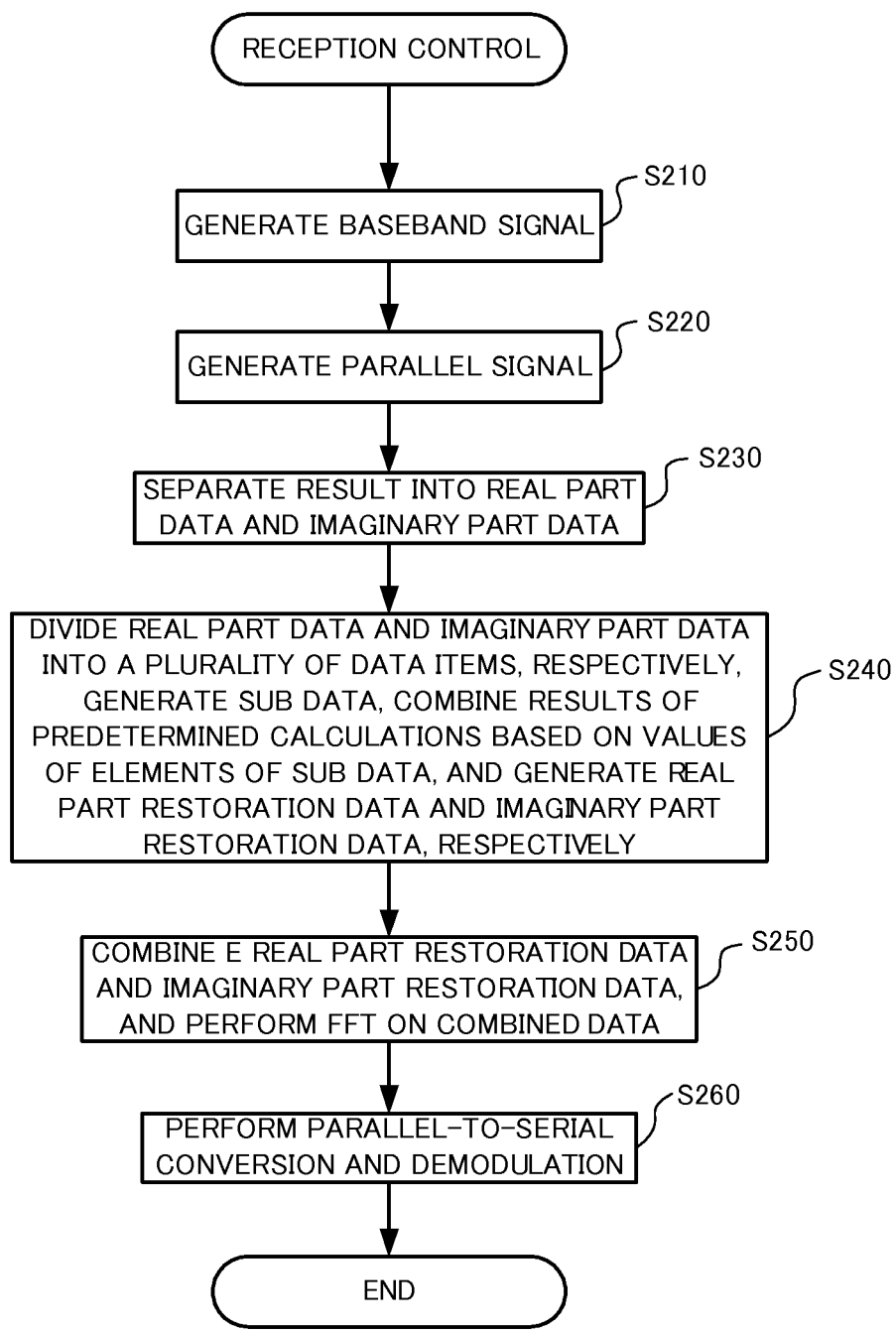

COMMUNICATION DEVICE AND COMMUNICATION METHOD

CROSS-REFERENCE TO RELATED APPLICATION

This application claims the benefit of Japanese Patent Application No. 2012-070406, filed on Mar. 26, 2012, the entire disclosure of which is incorporated by reference herein

FIELD

The present invention relates to a communication device and a communication method.

BACKGROUND

Unexamined Japanese Patent Application Kokai Publication No. 2006-165781 discloses a communication device and a communication method.

The entire disclosure of Unexamined Japanese Patent Application Kokai Publication No. 2006-165781 is incorporated by reference herein.

SUMMARY

In order to achieve the above-described purpose, a communication device according to a first aspect of the present invention is a communication device which communicates with other equipment by wireless communications in accordance with an orthogonal frequency division multiplexing, including:

a modulator which modulates an input signal, assigns the signal to subcarriers frequency components of which are orthogonal to each other, and generates a subcarrier modulation signal;

an IFFT calculator which performs reverse Fast Fourier Transform on the subcarrier modulation signal;

a separator which separates a calculation result by the IFFT calculator into real part data which is a real part of the calculation result, and imaginary part data which is an imaginary part of the calculation result;

a calculator which generates, with respect to each of the real part data and the imaginary part data, post-distribution sub data in which the signs of respective elements are the same, values of elements are different from each other, and the total of the values of elements matches with the calculation result of the element of the real part data or the imaginary part data after performing a calculation on each element of the real part data and the imaginary part data, performs a post-distribution calculation on each element of the post-distribution sub data, arranges the post-distribution sub data on which the post-distribution calculation is performed in order, based on the order of the elements of the real part data or the imaginary part data, and combines arranged post-distribution sub data to generate real part post-distribution data and imaginary part post-distribution data;

a combiner which generates a baseband signal based on the data in which the real part post-distribution data and the imaginary part post-distribution data generated by the calculator are combined; and a transmitter which generates a transmission signal from the baseband signal to transmit generated transmission signal.

Preferably, the calculator, with respect to input data which includes the real part data or the imaginary part data, when the value of the element of the input data is equal to or larger than 0, or the value of the element is larger than 0, performs, using a difference between the value of the element of the input data and a positive threshold, the calculation which adds a value, the sign of the value being the same as the element of the input data and the absolute value of the value being the same as the absolute value of the difference, to the element of the input data;

when the value of the element of the input data is less than 0, or equal to or less than 0, performs, using a difference between the value of the element of the input data and a negative threshold, the calculation which adds a value, the sign of the value being the same as the element of the input data, and the absolute value of the value being the same as the absolute value of the difference, to the element of the input data; and after that, when the value of the element of the input data is equal to or larger than the positive threshold or is larger than the positive threshold, or when the value of the element of the input data is equal to or less than the negative threshold, or is less than negative threshold, generates the post-distribution sub data including two elements, in which the absolute value of an element in a first row is equal to a value obtained by adding a divided result of the absolute value of the difference by 2 to the absolute value of an element in a second row, and performs the post-distribution calculation which subtracts a value from each element of the post-distribution sub data, a sign of subtracting value being the same as the element of the input data, and an absolute value of the subtracting value being a division of the absolute value of the difference by 2, in any of cases where the value of the element of the input data is larger than the negative threshold and less than the positive threshold, the value of the element is larger than the negative threshold and is equal to or less than the positive threshold, the value of the element is equal to or larger than the negative threshold and is less than the positive threshold, and the value of the element is equal to or larger than the negative threshold and is equal to or less than the positive threshold, generates the post-distribution sub data including two elements, in which the absolute value of the element in the first row is equal to a value obtained by subtracting the divided result of the absolute value of the difference by 2 from the absolute value of the element in the second row, and performs the post-distribution calculation which adds a value to each element of the post-distribution sub data, a sign of adding value being the same as the element of the input data, and an absolute value of the adding value is a division of the absolute value of the difference by 2.

Preferably, an absolute value of the negative threshold is the same as an absolute value of the positive threshold.

Preferably, the calculator uses the same positive threshold and the same negative threshold for the real part data and the imaginary part data.

A communication device according to a second aspect of the present invention is a communication device which communicates with other equipment by wireless communications in accordance with an orthogonal frequency division multiplexing, including:

a receiver which receives a transmission signal and generates a baseband signal;

a serial-parallel converter which performs serial-to-parallel conversion on the baseband signal to generate a parallel signal;

a receiving side separator which separates the parallel signal into real part data which is a real part of the parallel signal, and imaginary part data which is an imaginary part of the parallel signal;

an inverse calculator which equally divides the real part data of the parallel signal and the imaginary part data of the parallel signal into a plurality of data items respectively to generate sub data, detects a calculation corresponding to the sub data based on the value of the element of the sub data, lets a result of the calculation using the value of the element of the sub data be elements, arranges the elements based on the order of the sub data, and combines the arranged elements to generate real part restoration data and imaginary part restoration data, respectively;

a receiving side combiner which combines the real part restoration data and the imaginary part restoration data generated by the inverse calculator;

an FFT calculator which performs Fast Fourier Transform on the calculation result of the receiving side combiner to generate a subcarrier modulation signal; and a demodulator which demodulates the subcarrier modulation signal with a predetermined demodulation method.

Preferably, the inverse calculator:

generates the sub data items which includes two elements, respectively;

performs the calculation which adds the element in the first row of the sub data, and the element in the second row of the sub data, when the value of the element in the first row of the sub data is equal to or larger than 0, or is larger than 0, and the value of the element in the first row is equal to or larger than the value of the element in the second row of the sub data, or is larger than the value of the element in the second row, or when the value of the element in the first row of the sub data is less than 0, or is equal to or less than 0, and the value of the element in the first row is equal to or less than the value of the element in the second row of the sub data, or is less than the value of the element in the second row; and performs the calculation which subtracts a multiplication result of the element in the second row of the sub data by 3 from a multiplication result of the element in the first row of the sub data by 5, when the value of the element in the first row of the sub data is equal to or larger than 0, or is larger than 0, and the value of the element in the first row is less than the value of the element in the second row of the sub data, or is equal to or less than the value of the element in the second row, or when the value of the element in the first row of the sub data is less than 0, or is equal to or less than 0, and the value of the element in the first row is larger than the value of the element in the second row of the sub data, or is equal to or larger than the value of the element in the second row.

A communication method according to a third aspect of the present invention is a communication method for a communication device which communicates with other equipment by wireless communications in accordance with an orthogonal frequency division multiplexing, including:

a modulation step which modulates an input signal, assigns the signal to subcarriers frequency components of which are orthogonal to each other, and generates a subcarrier modulation signal;

an IFFT step which performs reverse Fast Fourier Transform on the subcarrier modulation signal;

a separating step which separates a calculation result by the IFFT step into real part data which is a real part of the calculation result, and imaginary part data which is an imaginary part of the calculation result;

a calculating step which generates, with respect to each of the real part data and the imaginary part data, post-distribution sub data in which the signs of respective elements are the same, values of elements are different from each other, and the total of the values of elements matches with the calculation result of the element of the real part data or the imaginary part data after performing a calculation on each element of the real part data and the imaginary part data, performs a post-distribution calculation on each element of the post-distribution sub data, arranges the post-distribution sub data on which the post-distribution calculation is performed in order, based on the order of the elements of the real part data or the imaginary part data, and combines arranged post-distribution sub data to generate real part post-distribution data and imaginary part post-distribution data;

a combining step which generates a baseband signal based on the data in which the real part post-distribution data and the imaginary part post-distribution data generated by the calculating step are combined; and a transmitting step which generates a transmission signal from the baseband signal to transmit generated transmission signal.

Preferably, the calculating step includes, with respect to input data which includes the real part data or the imaginary part data, when the value of the element of the input data is equal to or larger than 0, or the value of the element is larger than 0, performing, by using a difference between the value of the element of the input data and a positive threshold, the calculation which adds a value, the sign of the value being the same as the element of the input data and the absolute value of the value being the same as the absolute value of the difference, to the element of the input data;

when the value of the element of the input data is less than 0, or equal to or less than 0, performing, by using a difference between the value of the element of the input data and a negative threshold, the calculation which adds a value, the sign of the value being the same as the element of the input data, and the absolute value of the value being the same as the absolute value of the difference, to the element of the input data; and after that, when the value of the element of the input data is equal to or larger than the positive threshold or is larger than the positive threshold, or when the value of the element of the input data is equal to or less than the negative equal to or is less than negative threshold, generating the post-distribution sub data including two elements, in which the absolute value of an element in a first row is equal to a value obtained by adding a divided result of the absolute value of the difference by 2 to the absolute value of an element in a second row, and performing the post-distribution calculation which subtracts a value from each element of the post-distribution sub data, a sign of subtracting value being the same as the element of the input data, and an absolute value of the subtracting value being a division of the absolute value of the difference by 2, in any of cases where the value of the element of the input data is larger than the negative threshold and less than the positive threshold, the value of the element is larger than the negative threshold and is equal to or less than the positive threshold, the value of the element is equal to or larger than the negative threshold and is less than the positive threshold, and the value of the element is equal to or larger than the negative threshold and is equal to or less than the positive threshold, generating the post-distribution sub data including two elements, in which the absolute value of the element in the first row is equal to a value obtained by subtracting the divided result of the absolute value of the difference by 2 from the absolute value of the element in the second row, and performing the post-distribution calculation which adds a value to each element of the post-distribution sub data, a sign of adding value being the same as the element of the input data, and an absolute value of the adding value is a division of the absolute value of the difference by 2.

Preferably, an absolute value of the negative threshold is the same as an absolute value of the positive threshold.

Preferably, the calculating step uses the same positive threshold and the same negative threshold for the real part data and the imaginary part data.

A communication method according to a fourth aspect of the present invention is a communication method for a communication device which communicates with other equipment by wireless communications in accordance with an orthogonal frequency division multiplexing, including:

a receiving step which receives a transmission signal and generates a baseband signal;

a serial-parallel conversion step which performs serial-to-parallel conversion on the baseband signal to generate a parallel signal;

a receiving side separating step which separates the parallel signal into real part data which is a real part of the parallel signal, and imaginary part data which is an imaginary part of the parallel signal;

an inverse calculating step which equally divides the real part data of the parallel signal and the imaginary part data of the parallel signal into a plurality of data items respectively to generate sub data, detects a calculation corresponding to the sub data based on the value of the element of the sub data, lets a result of the calculation using the value of the element of the sub data be elements, arranges the elements based on the order of the sub data, and combines the arranged elements to generate real part restoration data and imaginary part restoration data, respectively;

a receiving side combining step which combines the real part restoration data and the imaginary part restoration data generated by the inverse calculating step;

an FFT step which performs Fast Fourier Transform on the calculation result of the receiving side combiner to generate a subcarrier modulation signal; and a demodulating step which demodulates the subcarrier modulation signal with a predetermined demodulation method.

Preferably, the inverse calculating step includes:

generating the sub data items which includes two elements, respectively;

performing the calculation which adds the element in the first row of the sub data, and the element in the second row of the sub data, when the value of the element in the first row of the sub data is equal to or larger than 0, or is larger than 0, and the value of the element in the first row is equal to or larger than the value of the element in the second row of the sub data, or is larger than the value of the element in the second row, or when the value of the element in the first row of the sub data is less than 0, or is equal to or less than 0, and the value of the element in the first row is equal to or less than the value of the element in the second row of the sub data, or is less than the value of the element in the second row; and performing the calculation which subtracts a multiplication result of the element in the second row of the sub data by 3 from a multiplication result of the element in the first row of the sub data by 5, when the value of the element in the first row of the sub data is equal to or larger than 0, or is larger than 0, and the value of the element in the first row is less than the value of the element in the second row of the sub data, or is equal to or less than the value of the element in the second row, or when the value of the element in the first row of the sub data is less than 0, or is equal to or less than 0, and the value of the element in the first row is larger than the value of the element in the second row of the sub data, or is equal to or larger than the value of the element in the second row.

BRIEF DESCRIPTION OF THE DRAWINGS

A more complete understanding of this application can be obtained when the following detailed description is considered in conjunction with the following drawings, in which:

FIG. 2 is a block diagram illustrating another configuration example of a communication device according to the embodiment;

FIG. 4 is a flowchart illustrating an example of a transmission control operation performed by the communication device according to the embodiment;

FIG. 5 is a flowchart illustrating an example of a reception control operation performed by the communication device according to the embodiment;

DETAILED DESCRIPTION

In OFDM (Orthogonal Frequency-Division Multiplexing)-based communication system, a subcarrier modulation is performed on an input signal, and IFFT (Inverse Fast Fourier Transformation) is performed thereon, thereby generating a baseband signal. Therefore, this communication system has a character in which the baseband signal with a large signal peak is generated and PAPR (Peak-to-Average Power Ratio) increases, when the number of subcarriers increases and FFT (Fast Fourier Transformation) size increases. When PAPR is high, in order to transmit a signal without distortion, an amplifier with linearity in wide range is required. Under such circumstance, a technique for reducing PAPR is developed.

Unexamined Japanese Patent Application Kokai Publication No. 2006-165781 discloses a technique which controls phase of a subcarrier modulation signal based on optimal phase calculated by the sequential decision method before performing IFFT to reduce PAPR.

In OFDM-based communication system, one of the required matters is to reduce PAPR. With the technique disclosed in Unexamined Japanese Patent Application Kokai Publication No. 2006-165781, it is required to perform computation repeatedly in order to calculate the optimal phase to reduce PAPR, and to control a phase for every subcarrier. Moreover, with the technique disclosed in Unexamined Japanese Patent Application Kokai Publication No. 2006-165781, it is difficult to control the degree of reduction of PAPR.

A technique according to the present embodiment makes it possible to reduce PAPR and also to control the degree of reduction of PAPR in the OFDM-based communication system.

Hereinafter, embodiments of the present invention will be described in detail with reference to drawings. The identical reference marks are given to the identical or similar parts in drawings. In the following description, IFFT (Inverse Fast Fourier Transformation) refers to IFFT and IDFT (Inverse Discrete Fourier Transformation). Therefore, the embodiments of the present invention are configured, in some cases, so that IDFT is performed instead of IFFT. Similarly, FFT (Fast Fourier Transformation) refers to FFT and DFT (Discrete Fourier Transformation). Moreover, in case of performing IDFT and DFT, the FFT size in the following description means the size of DFT.

Figure 1:
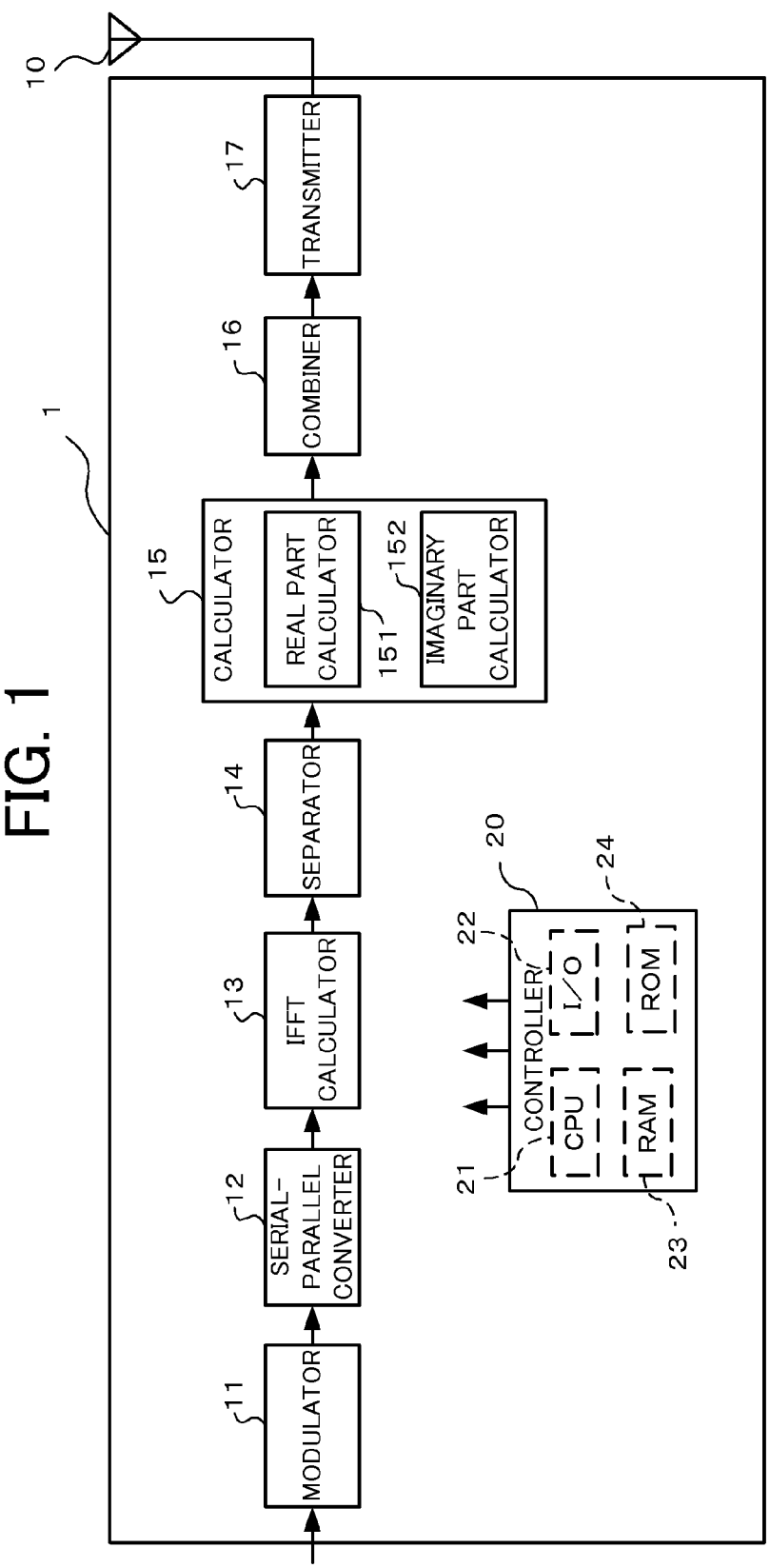
FIG. 1 is a block diagram illustrating a configuration example of a communication device according to an embodiment of the present invention.

FIG. 1 is a block diagram illustrating a configuration example of a communication device according to the embodiment of the present invention. The communication device 1 communicates with other equipment by wireless communications in 01-DM (Orthogonal Frequency-Division Multiplexing) manner. The communication device 1 includes an antenna 10, a modulator 11, a serial-parallel converter 12, an IFFT calculator 13, a separator 14, a calculator 15, a combiner 16, a transmitter 17, and a controller 20. The calculator 15 includes a real part calculator 151 and an imaginary part calculator 152.

The controller 20 includes a CPU (Central Processing Unit) 21, a RAM (Random Access Memory) 23, and a ROM (Read-Only Memory) 24. Although signal wires from the controller 20 to respective units are omitted in order to avoid complication and for sake of simplicity, the controller 20 is connected to each unit of the communication device 1 through an I/O (Input/Output) 22, and performs a control of start and end of processes by those units and the contents of processes.

In some embodiments, the RAM 23 stores data for generating a transmission frame. The ROM 24 stores a control program by which the controller 20 controls operation of the communication device 1. The controller 20 controls the communication device 1 based on the control program.

FIG. 2 is a block diagram illustrating another configuration example of the communication device according to the embodiment. In order to provide a reception function to the above-described communication device 1, the communication device 1 illustrated in FIG. 2 is further includes a demodulator 31, a parallel-serial converter 32, an FFT calculator 33, a receiving side combiner 34, an inverse calculator 35, a receiving side separator 36, a receiver 37, and a transmission and reception switch 38. The inverse calculator 35 includes a real part inverse calculator 351 and an imaginary part inverse calculator 352. With reference to the communication device 1 illustrated in FIG. 2 which includes a transmission function and the reception function, a communication procedure by the communication device 1 will be described below.

The modulator 11 modulates an input signal to generate a modulation signal, and transfers the modulation signal to the serial-parallel converter 12. As a modulation scheme, QPSK (Quadrature Phase-Shift Keying) is used, for example. The serial-parallel converter 12 performs serial-to-parallel conversion on the modulation signal, assigns the signal to subcarriers frequency components of which are orthogonal to each other, and generates a subcarrier modulation signal. Then, the subcarrier modulation signal is transferred to the IFFT calculator 13. The IFFT calculator 13 performs IFFT on the subcarrier modulation signal, and transfers the calculation result to the separator 14.

The separator 14 separates the result of calculation by the IFFT calculator 13 into real part data which is a real part of the calculation result, and imaginary part data which is an imaginary part of the calculation result, and transfers the real part data and the imaginary part data to the calculator 15. The calculator 15 transfers the real part data to the real part calculator 151, and transfers the imaginary part data to the imaginary part calculator 152. Since operations of the real part calculator 151 and the imaginary part calculator 152 are the same, the operation of the real part calculator 151 will be described.

The real part calculator 151 performs a predetermined calculation on each element of the input data which is the real part data, and after that, generates post-distribution sub data in which the signs of respective elements are the same, values of elements are different from each other, and the total of the values of elements matches with the calculation result of the element of the input data. The real part calculator 151 performs a post-distribution calculation to each element of post-distribution sub data, arranges in order the post-distribution sub data on which the post-distribution calculation is performed, based on the order of the elements of the input data, and combines the arranged post-distribution sub data to generate real part post-distribution data.

For example, when the value of the element of the input data is equal to or larger than 0, or the value of the element is larger than 0, the real part calculator 151 performs, by using a difference between the value of the element of the input data and a positive threshold, a calculation which adds a value, the sign of the value being the same as the element of the input data and the absolute value of the value being the same as the absolute value of the difference, to the element of the input data. When the value of the element of the input data is less than 0, or is equal to 0 or less, by using a difference between the value of the element of the input data and a negative threshold, a calculation is performed which adds a value to the element of the input data, the sign of the value being the same as the element of the input data, and the absolute value of the value being the same as the absolute value of the difference. When the value of the element of the input data is equal to or larger than the positive threshold, or is larger than the positive threshold, or the value is equal to or less than the negative threshold, or is less than the negative threshold, the real part calculator 151 generates the post-distribution sub data including two elements, in which the absolute value of the element in the first row is equal to a value obtained by adding a divided result of the absolute value of the above-described difference by 2 to the absolute value of the element of the second row. Furthermore, the real part calculator 151 performs the post-distribution calculation, in which a value obtained by dividing a below-described value by 2 is subtracted from each element of the post-distribution sub data, the sign of the divided value being the same as the sign of the element of the input data, and the absolute value thereof being the same as the absolute value of the above-described difference. In cases where the value of the element of the input data is larger than the negative threshold and less than the positive threshold, in cases where the value of the element is larger than the negative threshold and is equal to or less than positive larger threshold, in cases where the value of the element is equal to or larger than the negative threshold and is less than the positive threshold, and in cases where the value of the element is equal to or larger than the negative threshold and is equal to or less than the positive threshold, the real part calculator 151 generates the post-distribution sub data including two elements, in which the absolute value of the element in the first row is equal to a value obtained by subtracting the divided result of the absolute value of the above-described difference by 2 from the absolute value of the element in the second row. Furthermore, the real part calculator 151 performs the post-distribution calculation which adds a value to each element of the post-distribution sub data, a sign of adding value being the same as the element of the input data, and an absolute value of the adding value is a division of the absolute value of the difference by 2.

The positive threshold and the negative threshold are determined in advance in consideration of the degree of reduction of PAPR (Peak-to-Average Power Ratio), and the degree of deterioration of BER (Bit Error Rate), as described below. Note that an absolute value of the positive threshold and an absolute value of the negative threshold have the same value in some cases, and have different values in other cases. When the absolute value of the positive threshold and the absolute value of the negative threshold are set to the same value, it is possible to simplify implementation of above-described data processing.

The real part calculator 151 performs a calculation on the element of the input data, for example as follows. Here, FFT size is expressed by N, and the elements of the input data are expressed by $u_i$ (i=0, 1, ..., N−1). The positive threshold is expressed by $\tau_+$. When the value $u_i$ of the element of the input data is equal to or larger than the positive threshold $\tau_+$, the difference $\alpha$ between the value of the element and the positive threshold is used as represented by following equation (1). Since the value of the element of the input data is equal to or larger than the positive threshold, $\alpha$ satisfies $\alpha \geq 0$.

[Equation 1]

$$\alpha = u_i - \tau_+ \quad (1)$$

The real part calculator 151 performs a calculation which adds a value, a sign of which is the same as the element $u_i$ to and an absolute value of which is equal to an absolute value of the difference $\alpha$ represented by the above-described equation (1), to the element $u_i$ of the input data. The calculation result $\beta$ for the element $u_i$ of the input data is represented by following equation (2).

[Equation 2]

$$\beta = u_i + \alpha \quad (2)$$

The real part calculator 151 generates the post-distribution sub data. The post-distribution sub data include two elements. In the post-distribution sub data, the element in the first row and the element in the second row have the positive sign, but have different values. Moreover, in the post-distribution sub data, the total of the element in the first row and the element in the second row matches with the calculation result of the element of the input data represented by the above-described equation (2). Furthermore, since the value $u_i$ of the element of the input data is equal to or larger than the positive threshold $\tau_+$, in the post-distribution sub data, the absolute value of the element in the first row is a value which is equal to an adding result of a division of the absolute value of the above-described difference by 2 to the absolute value of the element in the second row. Each element of the post-distribution sub data generated based on the above-described calculation result for the element $u_i$ of the input data is represented by following equation (3). In the equation (3), $v_{i\_1}$ expresses the element in the first row, and $v_{i\_2}$ expresses the element in the second row.

[Equation 3]

$$v_{i\_1} = \frac{\left(\beta - \frac{\alpha}{2}\right)}{2} + \frac{\alpha}{2} \quad (3)$$

$$v_{i\_2} = \frac{\left(\beta - \frac{\alpha}{2}\right)}{2}$$

The real part calculator 151 performs the post-distribution calculation. This calculation subtracts a certain value from each of the elements ($v_{i\_1}$, $v_{i\_2}$) of the post-distribution sub data. The certain value is a value, a sign of which is the same as the element $u_i$ of the input data, and an absolute value of which is a division of the absolute value of above-described difference by 2. The post-distribution sub data ($w_{i\_1}$, $w_{i\_2}$) which is applied the post-distribution calculation is represented by following equation (4). The following equation (5) is derived from the following equation (4) by deformation.

[Equation 4]

$$w_{i\_1} = \frac{\left(\beta - \frac{\alpha}{2}\right)}{2} \quad (4)$$

$$w_{i\_2} = \frac{\left(\beta - \frac{\alpha}{2}\right)}{2} - \frac{\alpha}{2}$$

[Equation 5]

$$w_{i\_1} = \frac{3}{4}u_i - \frac{1}{4}\tau_+ \quad (5)$$

$$w_{i\_2} = \frac{1}{4}u_i + \frac{1}{4}\tau_+$$

When the value $u_i$ of the element of the input data is equal to or larger than 0, and is less than the positive threshold $\tau_+$ on the other hand, the difference $\alpha$ between the value $u_i$ of the element and the positive threshold $\tau_+$ is used, as represented by following equation (6). Since the value $u_i$ of the element of the input data is equal to or larger than 0, and is less than the positive threshold $\tau_+$, $\alpha$ satisfies $\alpha > 0$.

[Equation 6]

$$\alpha = \tau_+ - u_i \quad (6)$$

The real part calculator 151 performs a predetermined calculation. In the calculation, a certain value is added to the element $u_i$ of the input data. The certain value is a value, a sign of which is the same as the element $u_i$ and an absolute value of which is the same as the absolute value of difference $\alpha$ represented by the above-described equation (6) (that is, $\alpha$). The calculation result $\beta$ for the element $u_i$ of the input data is represented by the above-described equation (2). Subsequently, the real part calculator 151 generates the post-distribution sub data. The post-distribution sub data includes two elements. In the post-distribution sub data, the element in the first row and the element in the second row have positive sign, but have different values. The total of the element in the first row and the element in the second row matches with the calculation result $\beta$ for the element $u_i$ of the input data represented by the above-described equation (2). Moreover, since the value $u_i$ of the element of the input data is equal to or larger than 0, and is less than the positive threshold $\tau_+$ in the post-distribution sub data, the absolute value of the element in the first row is equal to a value obtained by subtracting the dividing result of the absolute value of the above-described difference $\alpha$ by 2 from the absolute value of the element in the second row. The post-distribution sub data are represented by following equation (7).

[Equation 7]

$$v_{i\_1} = \frac{\left(\beta - \frac{\alpha}{2}\right)}{2} \quad (7)$$

$$v_{i\_2} = \frac{\left(\beta - \frac{\alpha}{2}\right)}{2} + \frac{\alpha}{2}$$

The real part calculator 151 performs the post-distribution calculation. In the calculation, a certain value is added to each element ($v_{i\_1}$, $v_{i\_2}$) of the post-distribution sub data. The sign of the certain value is the same as the element $u_i$ and an absolute value of the certain value is the same as a division of the absolute value of above-described difference $\alpha$ by 2. The post-distribution sub data ($w_{i\_1}$, $w_{i\_2}$) which is applied the post-distribution calculation is represented by following equation (8). The following equation (9) is derived from the following equation (8) by deformation.

[Equation 8]

$$w_{i\_1} = \frac{\left(\beta - \frac{\alpha}{2}\right)}{2} + \frac{\alpha}{2} \quad (8)$$

$$w_{i\_2} = \frac{\left(\beta - \frac{\alpha}{2}\right)}{2} + \alpha$$

[Equation 9]

$$w_{i\_1} = -\frac{1}{4}u_i + \frac{3}{4}\tau_+ \quad (9)$$

$$w_{i\_2} = -\frac{3}{4}u_i + \frac{5}{4}\tau_+$$

Supposing the negative threshold is $\tau_-$ on the other hand, when the value $u_i$ of the element of the input data is less than 0 and is larger than the negative threshold $\tau_-$, the difference $\alpha$ between the value $u_i$ of the element and the negative threshold $\tau_-$ is used, as represented by following equation (10). Since the value $u_i$ of the element of the input data is less than 0 and is larger than the negative threshold, $\alpha$ satisfies $\alpha<0$.

[Equation 10]

$$\alpha = \tau_- - u_i \quad (10)$$

The real part calculator 151 performs a predetermined calculation. In the calculation, a certain value is added to the element of the input data. The certain value is a value, a sign of which is the same as the element $u_i$ and an absolute value of which is the same as the absolute value of difference $\alpha$ represented by the above-described equation (10). In the above-described equation (10), $\alpha$ satisfies $\alpha<0$, and the calculation result $\beta$ of the element $u_i$ of the input data is represented by the above-described equation (2). Subsequently, the real part calculator 151 generates the post-distribution sub data. The post-distribution sub data includes two elements ($v_{i\_1}$, $v_{i\_2}$). In the post-distribution sub data, the element $v_{i\_1}$ in the first row and the element $v_{i\_2}$ in the second row have negative sign, and have different values. Moreover, in the post-distribution sub data, the total of the element $v_{i\_1}$ in the first row and the element $v_{i\_2}$ in the second row matches with the calculation result $\beta$ for the element of the input data represented by the above-described equation (2). Since the value $u_i$ of the element of the input data is less than 0 and is larger than the negative threshold $\tau_-$, the absolute value of the element $v_{i\_1}$ in the first row is equal to a value obtained by subtracting, from the absolute value of element $v_{i\_2}$ in the second row, a division of the absolute value of the above-described difference $\alpha$ by 2. The post-distribution sub data is represented by following equation (11).

[Equation 11]

$$v_{i\_1} = \frac{\left(\beta - \frac{\alpha}{2}\right)}{2} \quad (11)$$

$$v_{i\_2} = \frac{\left(\beta - \frac{\alpha}{2}\right)}{2} + \frac{\alpha}{2}$$

The real part calculator 151 performs a predetermined calculation. In the calculation, a certain value is added to each element $u_i$ of the post-distribution sub data. The certain value is a value, a sign of which is the same as the element $u_i$ of the input data and an absolute value of which is a divided result of the absolute value of the above-described difference $\alpha$ by 2. The post-distribution sub data ($w_{i\_1}$, $w_{i\_2}$) to which the post-distribution calculation is applied is represented by following equation (12). The following equation (13) is derived from the following equation (12) by deformation.

[Equation 12]

$$w_{i\_1} = \frac{\left(\beta - \frac{\alpha}{2}\right)}{2} + \frac{\alpha}{2} \quad (12)$$

$$w_{i\_2} = \frac{\left(\beta - \frac{\alpha}{2}\right)}{2} + \alpha$$

[Equation 13]

$$w_{i\_1} = -\frac{1}{4}u_i + \frac{3}{4}\tau_- \quad (13)$$

$$w_{i\_2} = -\frac{3}{4}u_i + \frac{5}{4}\tau_-$$

On the other hand, when the value $u_i$ of the element of the input data is equal to or less than the negative threshold $\tau_-$, the difference $\alpha$ between the value $u_i$ of the element and the negative threshold $\tau_-$ is used, as represented by following equation (14). Since the value $u_i$ of the element of the input data is equal to or less than the negative threshold $\tau_-$, $\alpha$ satisfies $\alpha \leq 0$.

$$\alpha = u_i - \tau_- \quad (14)$$

The real part calculator 151 performs a predetermined calculation. In the calculation, a certain value is added to the element $u_i$ of the input data. The certain value is a value, a sign of which is the same as the element $u_i$, and an absolute value of which is the same as the absolute value of the difference $\alpha$ represented by the above-described equation (14). The calculation result $\beta$ of the element $u_i$ of the input data is represented by the above-described equation (2). Furthermore, the real part calculator 151 generates the post-distribution sub data. The post-distribution sub data include two elements ($v_{i\_1}$, $v_{i\_2}$). In the post-distribution sub data, the element $v_{i\_1}$ in the first row and the element $v_{i\_2}$ in the second row have negative sign, and have different values. Moreover, in the post-distribution sub data, the total of the element $v_{i\_1}$ in the first row and the element $v_{i\_2}$ in the second row matches with the calculation result for the element of the input data represented by the above-described equation (2). Moreover, since the value $u_i$ of the element of the input data is equal to or less than the negative threshold $\tau_-$ in the post-distribution sub data, the absolute value of the element $v_{i\_1}$ in the first row is equal to a value obtained by adding a divided result of the absolute value of the above-described difference $\alpha$ by 2 to the absolute value of the element $v_{i\_2}$ in the second row. The post-distribution sub data are represented by following equation (15).

[Equation 15]

$$v_{i\_1} = \frac{\left(\beta - \frac{\alpha}{2}\right)}{2} + \frac{\alpha}{2} \quad (15)$$

$$v_{i\_2} = \frac{\left(\beta - \frac{\alpha}{2}\right)}{2}$$

The real part calculator 151 performs the post-distribution calculation. In the calculation, a certain value is subtracted from each element ($v_{i\_1}$, $v_{i\_2}$) of the post-distribution sub data. The certain value is a value, a sign of which is the same as the element $u_i$ of the input data and an absolute value of which is a divided result of the absolute value of the above-described difference $\alpha$ by 2. The post-distribution sub data ($w_{i\_1}$, $w_{i\_2}$) to which the post-distribution calculation is applied is represented by following equation (16). The following equation (17) is derived from the following equation (16) by deformation.

[Equation 16]

$$w_{i\_1} = \frac{\left(\beta - \frac{\alpha}{2}\right)}{2} \quad (16)$$

$$w_{i\_2} = \frac{\left(\beta - \frac{\alpha}{2}\right)}{2} - \frac{\alpha}{2}$$

[Equation 17]

$$w_{i\_1} = \frac{3}{4}u_i - \frac{1}{4}\tau_- \quad (17)$$

$$w_{i\_2} = \frac{1}{4}u_i + \frac{1}{4}\tau_-$$

The real part calculator 151 generates the post-distribution sub data ($v_{i\_1}$, $v_{i\_2}$) as described above, and performs above-described calculation on the post-distribution sub data ($v_{i\_1}$, $v_{i\_2}$). The real part calculator 151 arranges the post-distribution sub data ($v_{i\_2}$) to which the above-described calculation is applied based on the order of the elements of the input data, and combines the arranged data to generate the real part post-distribution data, as represented by following equation (18).

[Equation 18]

$$\begin{bmatrix} w_{0\_1} \\ w_{0\_2} \\ \vdots \\ w_{i\_1} \\ w_{i\_2} \\ \vdots \\ w_{N-1\_1} \\ w_{N-1\_2} \end{bmatrix} \quad (18)$$

Conditions for dividing into the cases based on the value $u_i$ of the element of the input data are not limited to above-described examples. Combinations of conditions for dividing into the cases for calculating and conditions for dividing into the cases for post-distribution calculation are arbitrary selected. For example, cases are divided into a case in which the value $u_i$ of the element of the input data is larger than the positive threshold $\tau_+$, a case in which the value is larger than 0 and is equal to or less than the positive threshold $\tau_+$, a case in which the value is larger than the negative threshold $\tau_-$ and is equal to or less than 0, and a case in which the value is equal to or less than the negative threshold $\tau_-$, and the above-described calculations are performed for the cases, respectively, for example.

Figure 3A:
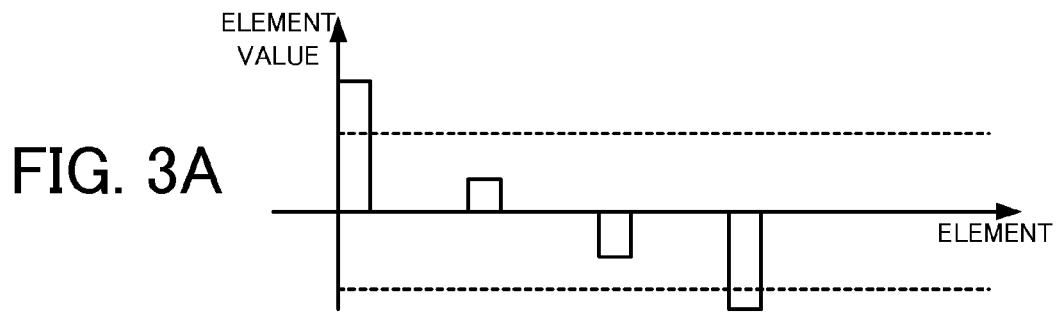
FIG. 3A is a drawing illustrating an outline (1) of data processing in a calculator according to the embodiment.
Figure 3B:
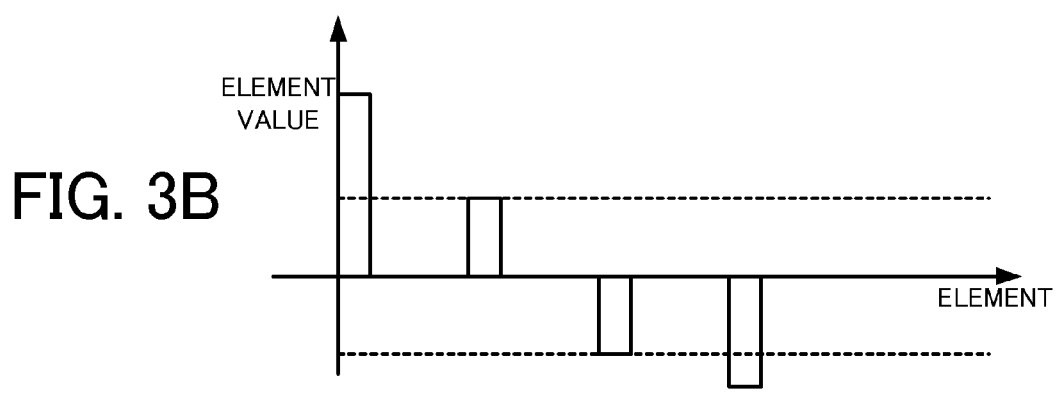
FIG. 3B is a drawing illustrating an outline (2) of data processing in the calculator according to the embodiment.
Figure 3C:
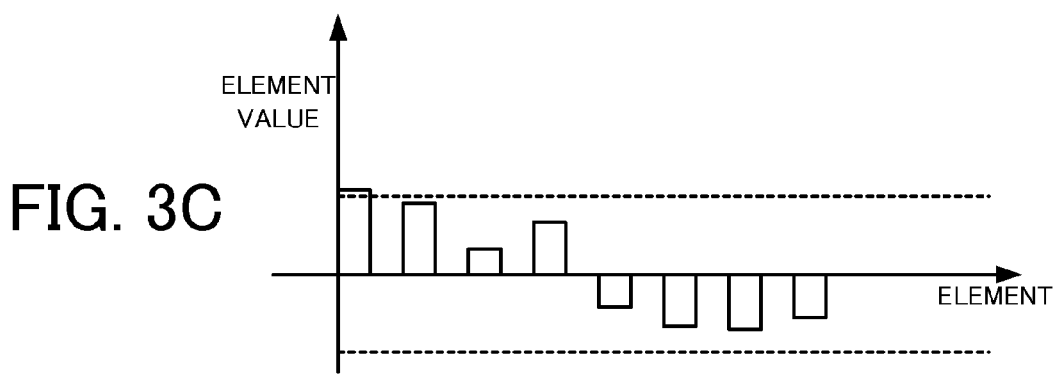
FIG. 3C is a drawing illustrating an outline (3) of data processing in the calculator according to the embodiment.
Figure 3D:
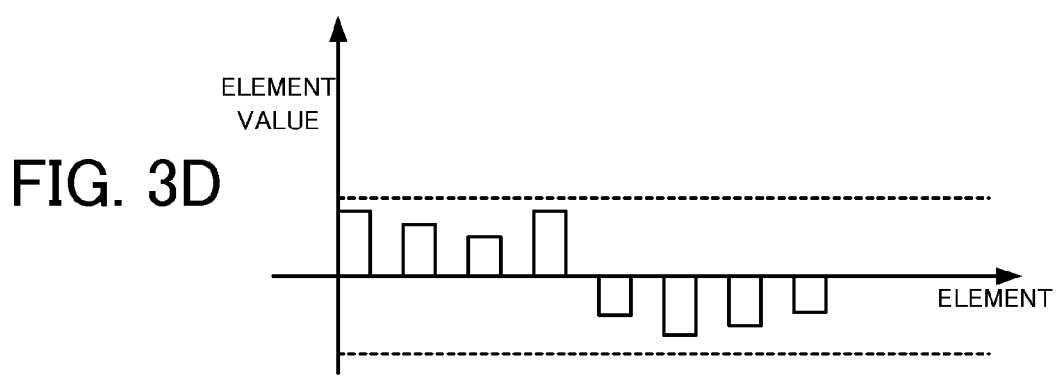
FIG. 3D is a drawing illustrating an outline (4) of data processing in the calculator according to the embodiment.

FIGS. 3A and 3B are drawings illustrating outlines of data processing in the calculator according to the embodiment. A horizontal axis expresses the element of the input data, and a vertical axis expresses the value $u_i$ of the element. The dotted lines represent the positive threshold $\tau_+$ and the negative threshold t, respectively. FIG. 3A illustrates the input data which is the real part data. In FIG. 3B, the result of calculation which adds the value, a sign of which is the same as the element of the input data, and the absolute value of which is the same as the absolute value of the above-described difference, to the element of the input data is illustrated. In FIG. 3C, the post-distribution sub data generated based on the element of the input data to which the calculation is applied illustrated in FIG. 3B. In FIG. 3D, the result of the post-distribution calculation to the post-distribution sub data illustrated in FIG. 3C is illustrated. As illustrated in the drawings, it is possible to reduce PAPR by performing the above-described process on the element of the input data and reducing a change of the value.

The imaginary part calculator 152 performs the above-described data processing as is the case in the real part calculator 151 using the imaginary part data as input data, and generates the imaginary part post-distribution data. The positive threshold and the negative threshold used by the real part calculator 151 and the imaginary part calculator 152 are different from each other, in some cases. In cases where the real part calculator 151 and the imaginary part calculator 152 use the same positive threshold and the same negative threshold, it is possible to realize the real part calculator 151 and the imaginary part calculator 152 by a single computing unit.

The calculator 15 transfers the real part post-distribution data generated by the real part calculator 151 and the imaginary part post-distribution data generated by the imaginary part calculator 152 to the combiner 16.

The combiner 16 generates the baseband signal based on the data in which the real part post-distribution data and the imaginary part post-distribution data are combined, and transfers the baseband signal to the transmitter 17. When the real part post-distribution data is expressed by w and the imaginary part post-distribution data is expressed by x, the combined data is represented by w+jx, where j is an imaginary unit. The transmitter 17 generates the transmission signal from the baseband signal, and transfers the transmission signal to other equipment through the transmission and reception switch 38 and the antenna 10.

FIG. 4 is a flowchart illustrating an example of a transmission control operation performed by the communication device according to the embodiment. The modulator 11 modulates the input signal to generate the modulation signal, and the serial-parallel converter 12 performs serial-to-parallel conversion on the modulation signal, and assigns the signal to the subcarriers frequency components of which are orthogonal to each other, and generates the subcarrier modulation signal (step S110). The IFFT calculator 13 performs IFFT on the subcarrier modulation signal (step S120).

The separator 14 separates the calculation result by the IFFT calculator 13 into the real part data which is a real part of the calculation result, and the imaginary part data which is the imaginary part of the calculation result (step S130). The real part calculator 151 performs a calculation on each element of the real part data to generate post-distribution sub data in which the sign of respective elements are the same, values of respective elements are different from each other, and the total of the values of respective elements matches with the calculation result for the element of the real part data. The real part calculator 151 performs the post-distribution calculation on each element of the post-distribution sub data, arranges the post-distribution sub data to which the calculation is applied in order, based on the order of the elements of the real part data, and combines the arranged post-distribution sub data to generate real part post-distribution data. To the imaginary part data, the imaginary part calculator 152 performs the data processing in the same manner as the real part calculator 151 to generate the imaginary part post-distribution data (step S140).

The combiner 16 generates the baseband signal based on the data in which the real part post-distribution data and the imaginary part post-distribution data are combined (step S150). The transmitter 17 generates the transmission signal from the baseband signal, and transmits the transmission signal to other equipment through the transmission and reception switch 38 and the antenna 10 (step S160).

The process in a receiving side will be hereinafter described. Return to FIG. 2, the receiver 37 receives the transmission signal through the antenna 10 and the transmission and reception switch 38, generates the baseband signal, and transfers the baseband signal to the receiving side separator 36. The receiving side separator 36 performs serial-to-parallel conversion on the baseband signal to generate the parallel signal. The receiving side separator 36 separates the parallel signal into the real part data which is a real part of the parallel signal, and the imaginary part data which is the imaginary part of the parallel signal, and transfers the real part data and the imaginary part data of the parallel signal to the inverse calculator 35. The inverse calculator 35 transfers the real part data of the parallel signal to the real part inverse calculator 351, and transfers the imaginary part data of the parallel signal to the imaginary part inverse calculator 352. Since operation of the real part inverse calculator 351 and operation of the imaginary part inverse calculator 352 are the same, the operation of the real part inverse calculator 351 will be described.

The real part data of the parallel signal matches with the real part post-distribution data generated by the real part calculator 151 on the transmitting side. The real part inverse calculator 351 equally divides the real part data of the parallel signal into plurality of data items to generate the sub data. Then, the real part calculator 351 detects the calculation corresponding to the sub data based on the value of the element of the sub data. The real part inverse calculator 351 uses the result of the calculation using the value of element of the sub data as elements, to arrange the above-described elements in order based on the order of the sub data, and combines the arranged data to generate the real part restoration data. The number of division which is plural matches with the number of the post-distribution sub data items generated by the real part calculator 151 of the transmitting side, in other words, the number of elements of the input signal. It is assumed that the receiving side has the information about the number of division which is plural in advance.

The real part inverse calculator 351, for example, equally divides the real part data of the parallel signal into a plurality of data items to generate the sub data items which includes two elements, respectively. The sub data is generated by the real part calculator 151 of the transmitting side, and matches with the post-distribution sub data which is applied the post-distribution calculation. The real part inverse calculator 351 performs the calculation which adds the element in the first row of the sub data and the element in the second row of the sub data, when the value of the element in the first row of the sub data is equal to or larger than 0, or is larger than 0, and the value of the element in the first row is equal to or larger than the value of the element in the second row of the sub data, or is larger than the value of the element in the second row, or when the value of the element in the first row of the sub data is less than 0, or is equal to or less than 0, and the value of the element in the first row is equal to or less than the value of the element in the second row of the sub data, or is less than the value of the element in the second row. The real part inverse calculator 351 performs the calculation which subtracts a multiplication result of the element in the second row of the sub data by 3 from a multiplication result of the element in the first row of the sub data by 5, when the value of the element in the first row of the sub data is equal to or larger than 0, or is larger than 0, and the value of the element in the first row is less than the value of the element in the second row of the sub data, or is equal to or less than the value of the element in the second row, or when the value of the element in the first row of the sub data is less than 0, or is equal to or less than 0, and the value of the element in the first row is larger than the value of the element in the second row of the sub data, or is equal to or larger than the value of the element in the second row.

The above-described calculation is a calculation which is possible to restore, on the receiving side, the input signal from the real part post-distribution data generated by the real part calculator 151 of the transmitting side, and is not limited to above-described calculation.

Relation $w_{i\_1} \geq w_{i\_2} > 0$ is derived from $u_i \geq \tau+$ in the above-described equation (5), $0 < w_{i\_1} < w_{i\_2}$ is derived from $0 \leq u_i < \tau+$ in the above-described equation (9), $0 > w_{i\_1} > w_{i\_2}$ is derived from $\tau- < u_i < 0$ in the above-described equation (13), and $w_{i\_1} \leq w_{i\_2} < 0$ is derived from $u_i \leq \tau-$ in the above-described equation (17).

Therefore, when the calculations as illustrated in the above-described examples on the transmitting side, the real part inverse calculator 351 performs the following data processing, for example. The real part inverse calculator 351 performs the calculation which adds the element in the first row of the sub data and the element in the second row of the sub data, when the value of the element in the first row of the sub data is equal to or larger than 0, and is equal to or larger than the value of the element in the second row of the sub data, or when the value of the element in the first row of the sub data is less than 0, and is equal to or less than the value of the element in the second row of the sub data. In this case, the sub data is represented by the above-described equation (5) or equation (17), and therefore, the result $r_i$ of the calculation which adds the element in the first row of the sub data and the element in the second row of the sub data matches with the element $u_i$ of the real part data which is input data of the real part calculator 151, as represented by following equation (19).

[Equation 19]

$$r_i = w_{i\_1} + w_{i\_2} = u_i \quad (19)$$

Moreover, the real part inverse calculator 351 performs the calculation which subtracts a multiplication result of the element in the second row of the sub data by 3 from a multiplication result of the element in the first row of the sub data by 5, when the value of the element in the first row of the sub data is equal to or larger than 0, and is less than the value of the element in the second row of the sub data, or when the value of the element in the first row of the sub data is less than 0, and is larger than the value of the element in the second row of the sub data. In this case, the sub data is represented by the above-described equation (9) or equation (13), and therefore, the result $r_i$ of the calculation which subtracts a multiplication result of the element in the second row of the sub data by 3 from a multiplication result of the element in the first row of the sub data by 5 matches with the element $u_i$ of the real part data which is input data of the real part calculator 151, as represented by following equation (20).

[Equation 20]

$$r_i = 5w_{i\_1} - 3w_{i\_2} = u_i \quad (20)$$

The real part inverse calculator 351 uses an above-described calculation result as elements to arrange the above-described elements in order based on the order of the sub data, and combines the arranged data to generate the real part restoration data. The real part restoration data generated by the real part inverse calculator 351 based on the real part data of the parallel signal matches with the real part data generated by the separator 14 of the transmitting side.

With respect to the imaginary part data of the parallel signal, the imaginary part inverse calculator 352 performs above-described data processing as is the case in the real part inverse calculator 351, and generates imaginary part restoration data. The imaginary part restoration data generated by the imaginary part inverse calculator 352 matches with the imaginary part data generated by the separator 14 on the transmitting side. The positive threshold and negative threshold used by the real part inverse calculator 351 and the imaginary part inverse calculator 352 are different in some cases. When the real part inverse calculator 351 and the imaginary part inverse calculator 352 use the same positive threshold and the same negative threshold, it is possible to realize the real part inverse calculator 351 and the imaginary part inverse calculator 352 by single computing unit.

The inverse calculator 35 transfers the real part restoration data generated by the real part inverse calculator 351 and the imaginary part restoration data generated by the imaginary part inverse calculator 352 to the receiving side combiner 34.

The receiving side combiner 34 transfers the data in which the real part restoration data and the imaginary part restoration data are combined to the FFT calculator 33. When the real part restoration data is expressed by r and the imaginary part restoration data is expressed by s, combined data is represented by r+j s. The FFT calculator 33 performs FFT on the data transferred from the receiving side combiner 34 to generate a subcarrier modulation signal. The FFT calculator 33 transfers the subcarrier modulation signal to the parallel-serial converter 32.

The parallel-serial converter 32 performs parallel-to-serial conversion on the subcarrier modulation signal to generate a serial signal, and transfers the serial signal to the demodulator 31. The demodulator 31 demodulates the serial signal with a predetermined demodulation method. For example, the demodulator 31 performs QPSK demodulation on the serial signal. By this means, it is possible to demodulate and output, by the demodulator 31, the input signal modulated by the modulator 11.

FIG. 5 is a flowchart illustrating an example of a reception control operation performed by the communication device according to the embodiment. The receiver 37 receives the transmission signal through the antenna 10 and the transmission and reception switch 38, and generates the baseband signal (step S210). The receiving side separator 36 erforms serial-to-parallel conversion on the baseband signal to generate the parallel signal (step S220). The receiving side separator 36 separates the parallel signal into the real part data which is the real part of the parallel signal, and the imaginary part data which is the imaginary part of the parallel signal (step S230).

The real part inverse calculator 351 equally divides the real part data of the parallel signal into a plurality of data items to generate sub data, detects a calculation corresponding to the sub data based on the value of the element of the sub data, uses a result of the calculation using the value of the element of the sub data as the elements, arranges the elements based on the order of the sub data, and combines the arranged elements to generate the real part restoration data. To the imaginary part data of the parallel signal, the imaginary part inverse calculator 352 performs the data processing in the same manner as the real part inverse calculator 351, and generates the imaginary part restoration data (step S240).

The receiving side combiner 34 combines the real part restoration data and the imaginary part restoration data, and the FFT calculator 33 performs FFT on the combined data to generate the subcarrier modulation signal (step S250). The parallel-serial converter 32 performs parallel-to-serial conversion on the subcarrier modulation signal to generate the serial signal, and the demodulator 31 demodulates the serial signal with a predetermined demodulation method (step S260).

In accordance with the principle described above, the communication device 1 communicates as follows, for example. It is assumed that the real part data u generated by the separator 14 is represented by the following equation (21), when the number of subcarriers is 4. A subscript T indicates that the matrix is expressed by transposition.

[Equation 21]

As one example, it is assumed that the positive threshold is set to 5, and the negative threshold is set to −5. The real part post-distribution data generated by performing the data processing at the real part calculator 151 are represented by following equation (22), based on the above-described equation (5) for the element in the first row of the real part data, based on the above-described equation (9) for the element in the second row, based on the above-described equation (13) for the element in the third row, and based on the above-described equation (17) for the element in the fourth row.

[Equation 22]

$$w = \begin{bmatrix} \dfrac{19}{4} & \dfrac{13}{4} & \dfrac{13}{4} & \dfrac{19}{4} & -\dfrac{13}{4} & -\dfrac{11}{4} & -\dfrac{12}{4} & -\dfrac{16}{4} \end{bmatrix}^T \quad (22)$$

The process on the receiving side will described below. The real part data r of the parallel signal generated by the receiving side separator 36 matches with the real part post-distribution data w represented by the above-described equation (22). Each element of the real part restoration data generated by the real part inverse calculator 351 is represented by following equation (23), and matches with each element in the above-described equation (21). Therefore, it is found that it is possible to restore the input signal on the receiving side.

[Equation 23]

$$r_0 = \frac{19}{4} + \frac{13}{4} = 8 \quad (23)$$
$$r_1 = 5 \cdot \frac{13}{4} - 3 \cdot \frac{19}{4} = 2$$
$$r_2 = -\frac{13}{4} - \frac{11}{4} = -6$$
$$r_3 = -5 \cdot \frac{12}{4} + 3 \cdot \frac{16}{4} = -3$$

As described above, according to the communication device 1 of the embodiments of the present invention, it is possible to reduce PAPR in OFDM-based communication system by performing a calculation to the real part data and the imaginary part data, performing a post-distribution calculation on the post-distribution sub data generated based on the calculation result to combine the data, and generating a baseband signal. Moreover, it is possible to reduce PAPR and to control the degree of reduction of PAPR as described below.

(Concrete Example)

Now, effects of the embodiment of the invention is described using a simulation. The simulation is performed in which the baseband signal is generated and the calculation of PAPR is repeated, using a random signal as the input signal, for a conventional technique and the present embodiment of the invention. QPSK is used as a modulation scheme, and FFT size is set to 2048. CCDFs (Complementary Cumulative Distribution Functions) of PAPR for a conventional technique and the present embodiment of the invention, that is, the characteristics of the occurrence probability of PAPR, are compared. The conventional technique is a method of generating a baseband signal from a subcarrier modulation signal without applying the above-described calculations.

Figure 6:
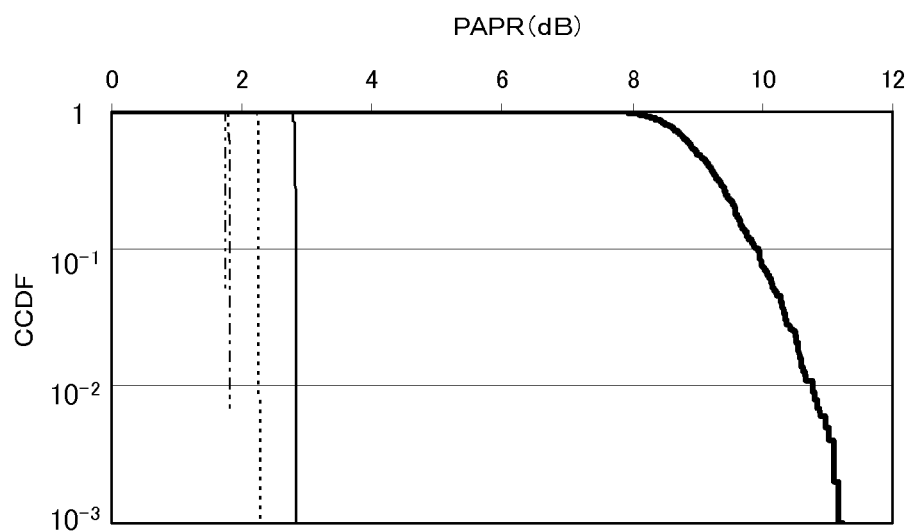
FIG. 6 is a drawing illustrating simulated CCDF characteristic of PAPR of baseband signal.

FIG. 6 is a drawing illustrating simulated CCDF characteristic of PAPR of the baseband signal. A horizontal axis represents PAPR (unit: dB), and a vertical axis represents CCDF of PAPR. In the present embodiment, the absolute values of the positive threshold and the negative threshold are set to τ, and the value of τ is changed. A thick solid line illustrates CCDF characteristic of PAPR of the conventional technique, a thin solid line illustrates a case where τ is set as τ=0.05 in the present embodiment, a dotted line illustrates a case where τ is set as τ=0.1, a dot-dash line illustrates a case where τ is set as τ=0.5, and a two-dot chain line illustrates a case where τ is set as τ=1. In the range illustrated in the drawing, it is found that PAPR in the present embodiment of the present invention is more decreased in any case in comparison with the conventional technique, and PAPR is reduced more by increasing τ.

Figure 7:
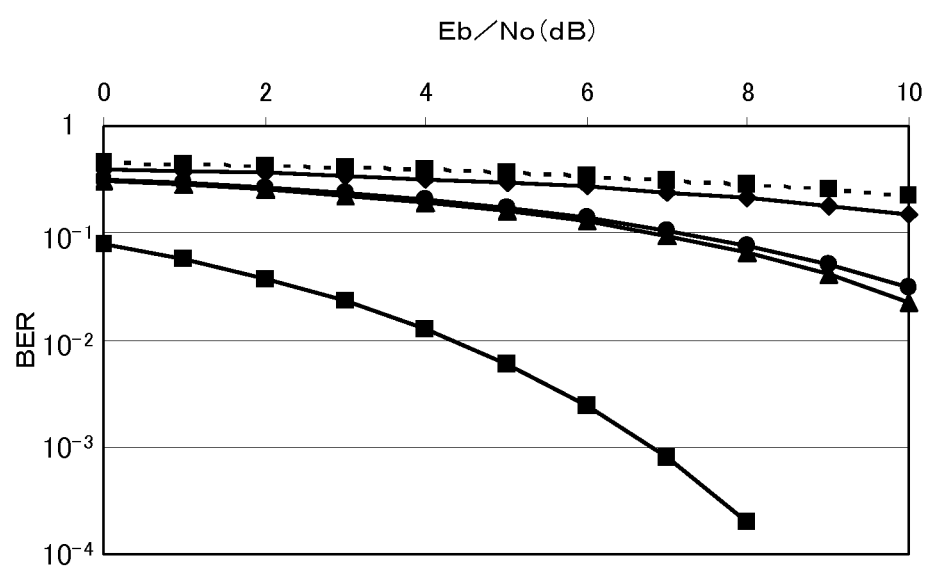
FIG. 7 is a drawing illustrating simulated characteristic of BER.

A simulation is similarly performed for BER. FIG. 7 is a drawing illustrating simulated characteristic of BER. A horizontal axis represents Eb/No (Energy per Bit to NOise power spectral density ratio), and a vertical axis represents BER. The unit of Eb/No is dB. The BER of the conventional technique is illustrated by a graph of solid line with square plotting points, a case of τ=0.05 in the present embodiment is illustrated by a graph of solid line with triangle plotting points, a case of τ=0.1 is illustrated by a graph of solid line with circle plotting points, a case of τ=0.5 is illustrated by a graph of solid line with rhombus plotting points, and a case of τ=1 is illustrated by a graph of dotted line with square plotting points.

In the present embodiment, BER is degraded as τ is increased. This is because increasing τ causes small values to be buried in noise. When the large and small relation of the elements of the post-distribution sub data has changed due to the noise in a transmission channel, the input signal cannot be correctly restored on the receiving side. However, it is possible to improve BER by increasing transmit power.

Figure 8:
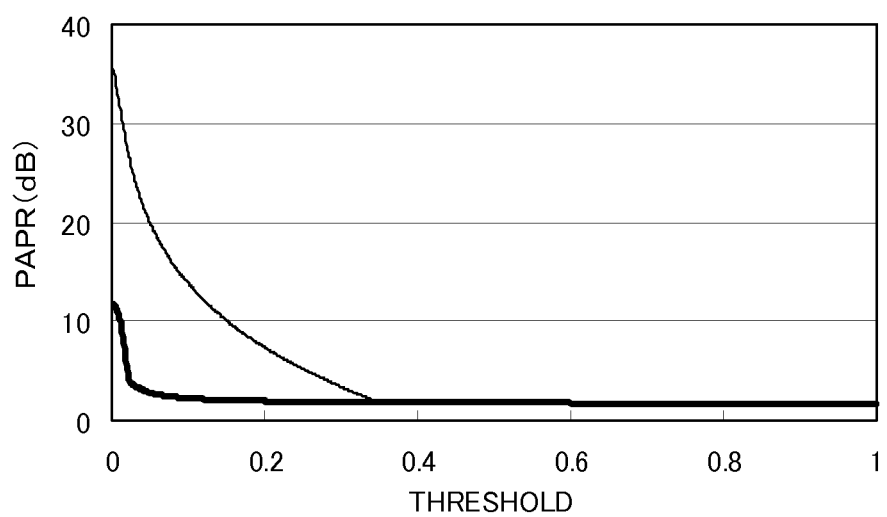
FIG. 8 is a drawing illustrating a relation of the simulated PAPR characteristic and threshold.

FIG. 8 is a drawing illustrating a relation of the simulated PAPR characteristic and threshold. A horizontal axis represents τ which is absolute value of the positive threshold or the negative threshold, and a vertical axis represents PAPR (unit: dB). Simulations are performed in which the threshold is changed from 0.001 to 1 for a case using a random signal as an input signal and a case using an identical signal as the input signal, respectively. The identical signal is a signal in which phases of respective elements of a subcarrier modulation signal are identical. A case where the random signal is used as the input signal is illustrated by a graph of thick solid line, and a case where the identical signal is used is illustrated by a graph of thin solid line.

It is found that PAPR is reduced as a threshold increases in any of the case using the random signal for the input signal and the case using the identical signal for the input signal.

According to the above-described simulation, it is found that, the present embodiment enables to reduce PAPR by performing a calculation to the real part data and the imaginary part data, performing a post-distribution calculation on the post-distribution sub data generated based on the calculation result to combine the data, and generating a baseband signal. Moreover, it is found that it is possible to control the degree of reduction of PAPR by changing a positive threshold and a negative threshold.

The embodiment of the present invention is not limited to above-described embodiments. The modulation manner of the modulation unit 11 is not limited to QPSK, but PSK(s) (Phase Shift Keying) other than QPSK, QAM (Quadrature Amplitude Modulation) and so on is used, in some cases. In some cases, it is configured so as to change an order of the modulation unit 11 and the serial-parallel converter 12, apply a serial-to-parallel conversion on the input signal, assign the result to subcarrier signals, and modulate each data of the parallel signal in a modulation manner. In this case, on the receiving side, an order of the demodulation unit 31 and the parallel-serial converter 32 is changed, and a demodulation process is performed.

The IFFT calculator 13 is configured to perform IDFT instead of IFFT in some cases. The FFT calculator 33 is configured to perform DFT instead of FFT in some cases. The calculation processes by the real part calculator 151 and the imaginary part calculator 152 are not limited to above-described embodiments, and it is configured, for example, so as to generate post-distribution sub data including four elements in some cases.

Having described and illustrated the principles of this application by reference to one or more preferred embodiments, it should be apparent that the preferred embodiments may be modified in arrangement and detail without departing from the principles disclosed herein and that it is intended that the application be construed as including all such modifications and variations insofar as they come within the spirit and scope of the subject matter disclosed herein.

1 Communication device
10 Antenna
11 Modulator
12 Serial-parallel converter
13 IFFT Calculator
14 Separator
15 Calculator
16 Combiner
17 Transmitter
20 Controller
21 CPU
22 I/O
23 RAM
24 ROM
31 Demodulator
32 Parallel-serial converter
33 FFT Calculator
34 Receiving side combiner
35 Inverse calculator
36 Receiving side separator
37 Receiver
38 Transmission and reception switch
151 Real part calculator
152 Imaginary part calculator
351 Real part inverse calculator
352 Imaginary part inverse calculator

What is claimed is:

1. A communication device which communicates with other equipment by wireless communications in accordance with an orthogonal frequency division multiplexing, comprising:
a modulator which modulates an input signal, assigns the signal to subcarriers frequency components of which are orthogonal to each other, and generates a subcarrier modulation signal;
an IFFT calculator which performs reverse Fast Fourier Transform on the subcarrier modulation signal;
a separator which separates a calculation result by the IFFT calculator into real part data which is a real part of the calculation result, and imaginary part data which is an imaginary part of the calculation result;
a calculator which generates, with respect to each of the real part data and the imaginary part data, post-distribution sub data in which the signs of respective elements are the same, values of elements are different from each other, and the total of the values of elements matches with the calculation result of the element of the real part data or the imaginary part data after performing a calculation on each element of the real part data and the imaginary part data, performs a post-distribution calculation on each element of the post-distribution sub data, arranges the post-distribution sub data on which the post-distribution calculation is performed in order, based on the order of the elements of the real part data or the imaginary part data, and combines arranged post-distribution sub data to generate real part post-distribution data and imaginary part post-distribution data;
a combiner which generates a baseband signal based on the data in which the real part post-distribution data and the imaginary part post-distribution data generated by the calculator are combined; and
a transmitter which generates a transmission signal from the baseband signal to transmit generated transmission signal.

2. The communication device according to claim 1, wherein
the calculator, with respect to input data which includes the real part data or the imaginary part data,
when the value of the element of the input data is equal to or larger than 0, or the value of the element is larger than 0, performs, using a difference between the value of the element of the input data and a positive threshold, the calculation which adds a value, the sign of the value being the same as the element of the input data and the absolute value of the value being the same as the absolute value of the difference, to the element of the input data;
when the value of the element of the input data is less than 0, or equal to or less than 0, performs, using a difference between the value of the element of the input data and a negative threshold, the calculation which adds a value, the sign of the value being the same as the element of the input data, and the absolute value of the value being the same as the absolute value of the difference, to the element of the input data; and after that,
when the value of the element of the input data is equal to or larger than the positive threshold or is larger than the positive threshold, or when the value of the element of the input data is equal to or less than the negative equal to or is less than negative threshold, generates the post-distribution sub data including two elements, in which the absolute value of an element in a first row is equal to a value obtained by adding a divided result of the absolute value of the difference by 2 to the absolute value of an element in a second row, and performs the post-distribution calculation which subtracts a value from each element of the post-distribution sub data, a sign of subtracting value being the same as the element of the input data, and an absolute value of the subtracting value being a division of the absolute value of the difference by 2,
in any of cases where the value of the element of the input data is larger than the negative threshold and less than the positive threshold, the value of the element is larger than the negative threshold and is equal to or less than the positive threshold, the value of the element is equal to or larger than the negative threshold and is less than the positive threshold, and the value of the element is equal to or larger than the negative threshold and is equal to or less than the positive threshold, generates the post-distribution sub data including two elements, in which the absolute value of the element in the first row is equal to a value obtained by subtracting the divided result of the absolute value of the difference by 2 from the absolute value of the element in the second row, and performs the post-distribution calculation which adds a value to each element of the post-distribution sub data, a sign of adding value being the same as the element of the input data, and an absolute value of the adding value is a division of the absolute value of the difference by 2.

3. The communication device according to claim 2, wherein an absolute value of the negative threshold is the same as an absolute value of the positive threshold.

4. The communication device according to claim 2, wherein the calculator uses the same positive threshold and the same negative threshold for the real part data and the imaginary part data.

5. The orthogonal frequency division multiplexing of claim 1 further comprising:
- a receiver which receives a transmission signal and generates a baseband signal;
- a serial-parallel converter which performs serial-to-parallel conversion on the baseband signal to generate a parallel signal;
- a receiving side separator which separates the parallel signal into real part data which is a real part of the parallel signal, and imaginary part data which is an imaginary part of the parallel signal;
- an inverse calculator which equally divides the real part data of the parallel signal and the imaginary part data of the parallel signal into a plurality of data items respectively to generate sub data, detects a calculation corresponding to the sub data based on the value of the element of the sub data, lets a result of the calculation using the value of the element of the sub data be elements, arranges the elements based on the order of the sub data, and combines the arranged elements to generate real part restoration data and imaginary part restoration data, respectively;
- a receiving side combiner which combines the real part restoration data and the imaginary part restoration data generated by the inverse calculator;
- an FFT calculator which performs Fast Fourier Transform on the calculation result of the receiving side combiner to generate a subcarrier modulation signal; and
- a demodulator which demodulates the subcarrier modulation signal with a predetermined demodulation method.

6. The communication device according to claim 5, wherein the inverse calculator
- generates the sub data items which include two elements, respectively;
- performs the calculation which adds the element in the first row of the sub data, and the element in the second row of the sub data, when the value of the element in the first row of the sub data is equal to or larger than 0, or is larger than 0, and the value of the element in the first row is equal to or larger than the value of the element in the second row of the sub data, or is larger than the value of the element in the second row, or when the value of the element in the first row of the sub data is less than 0, or is equal to or less than 0, and the value of the element in the first row is equal to or less than the value of the element in the second row of the sub data, or is less than the value of the element in the second row; and
- performs the calculation which subtracts a multiplication result of the element in the second row of the sub data by 3 from a multiplication result of the element in the first row of the sub data by 5, when the value of the element in the first row of the sub data is equal to or larger than 0, or is larger than 0, and the value of the element in the first row is less than the value of the element in the second row of the sub data, or is equal to or less than the value of the element in the second row, or when the value of the element in the first row of the sub data is less than 0, or is equal to or less than 0, and the value of the element in the first row is larger than the value of the element in the second row of the sub data, or is equal to or larger than the value of the element in the second row.

7. A communication method for a communication device which communicates with other equipment by wireless communications in accordance with an orthogonal frequency division multiplexing, comprising:
- a modulation step which modulates an input signal, assigns the signal to subcarriers frequency components of which are orthogonal to each other, and generates a subcarrier modulation signal;
- an IFFT step which performs reverse Fast Fourier Transform on the subcarrier modulation signal;
- a separating step which separates a calculation result by the IFFT step into real part data which is a real part of the calculation result, and imaginary part data which is an imaginary part of the calculation result;
- a calculating step which generates, with respect to each of the real part data and the imaginary part data, post-distribution sub data in which the signs of respective elements are the same, values of elements are different from each other, and the total of the values of elements matches with the calculation result of the element of the real part data or the imaginary part data after performing a calculation on each element of the real part data and the imaginary part data, performs a post-distribution calculation on each element of the post-distribution sub data, arranges the post-distribution sub data on which the post-distribution calculation is performed in order, based on the order of the elements of the real part data or the imaginary part data, and combines arranged post-distribution sub data to generate real part post-distribution data and imaginary part post-distribution data;
- a combining step which generates a baseband signal based on the data in which the real part post-distribution data and the imaginary part post-distribution data generated by the calculating step are combined; and
- a transmitting step which generates a transmission signal from the baseband signal to transmit generated transmission signal.

8. The communication method according to claim 7, wherein
- the calculating step includes, with respect to input data which includes the real part data or the imaginary part data,
- when the value of the element of the input data is equal to or larger than 0, or the value of the element is larger than 0, performing, by using a difference between the value of the element of the input data and a positive threshold, the calculation which adds a value, the sign of the value being the same as the element of the input data and the absolute value of the value being the same as the absolute value of the difference, to the element of the input data;
- when the value of the element of the input data is less than 0, or equal to or less than 0, performing, by using a difference between the value of the element of the input data and a negative threshold, the calculation which adds a value, the sign of the value being the same as the element of the input data, and the absolute value of the value being the same as the absolute value of the difference, to the element of the input data; and after that,
- when the value of the element of the input data is equal to or larger than the positive threshold or is larger than the positive threshold, or when the value of the element of the input data is equal to or less than the negative equal to or is less than negative threshold, generating the post-distribution sub data including two elements, in which the absolute value of an element in a first row is equal to a value obtained by adding a divided result of the absolute value of the difference by 2 to the absolute value of an element in a second row, and performing the post-distribution calculation which subtracts a value from each element of the post-distribution sub data, a sign of subtracting value being the same as the element of the input data, and an absolute value of the subtracting value being a division of the absolute value of the difference by 2, in any of cases where the value of the element of the input data is larger than the negative threshold and less than the positive threshold, the value of the element is larger than the negative threshold and is equal to or less than the positive threshold, the value of the element is equal to or larger than the negative threshold and is less than the positive threshold, and the value of the element is equal to or larger than the negative threshold and is equal to or less than the positive threshold, generating the post-distribution sub data including two elements, in which the absolute value of the element in the first row is equal to a value obtained by subtracting the divided result of the absolute value of the difference by 2 from the absolute value of the element in the second row, and performing the post-distribution calculation which adds a value to each element of the post-distribution sub data, a sign of adding value being the same as the element of the input data, and an absolute value of the adding value is a division of the absolute value of the difference by 2.

9. The communication method according to claim 8, wherein an absolute value of the negative threshold is the same as an absolute value of the positive threshold.

10. The communication method according to claim 8, wherein the calculating step uses the same positive threshold and the same negative threshold for the real part data and the imaginary part data.

11. The orthogonal frequency division multiplexing of claim 7 further comprising:
   a receiving step which receives a transmission signal and generates a baseband signal;
   a serial-parallel conversion step which performs serial-to-parallel conversion on the baseband signal to generate a parallel signal;
   a receiving side separating step which separates the parallel signal into real part data which is a real part of the parallel signal, and imaginary part data which is an imaginary part of the parallel signal;
   an inverse calculating step which equally divides the real part data of the parallel signal and the imaginary part data of the parallel signal into a plurality of data items respectively to generate sub data, detects a calculation corresponding to the sub data based on the value of the element of the sub data, lets a result of the calculation using the value of the element of the sub data be elements, arranges the elements based on the order of the sub data, and combines the arranged elements to generate real part restoration data and imaginary part restoration data, respectively;
   a receiving side combining step which combines the real part restoration data and the imaginary part restoration data generated by the inverse calculating step;
   an FFT step which performs Fast Fourier Transform on the calculation result of the receiving side combiner to generate a subcarrier modulation signal; and
   a demodulating step which demodulates the subcarrier modulation signal with a predetermined demodulation method.

12. The communication method according to claim 11, wherein the inverse calculating step includes:
   generating the sub data items which includes two elements, respectively;
   performing the calculation which adds the element in the first row of the sub data, and the element in the second row of the sub data, when the value of the element in the first row of the sub data is equal to or larger than 0, or is larger than 0, and the value of the element in the first row is equal to or larger than the value of the element in the second row of the sub data, or is larger than the value of the element in the second row, or when the value of the element in the first row of the sub data is less than 0, or is equal to or less than 0, and the value of the element in the first row is equal to or less than the value of the element in the second row of the sub data, or is less than the value of the element in the second row; and
   performing the calculation which subtracts a multiplication result of the element in the second row of the sub data by 3 from a multiplication result of the element in the first row of the sub data by 5, when the value of the element in the first row of the sub data is equal to or larger than 0, or is larger than 0, and the value of the element in the first row is less than the value of the element in the second row of the sub data, or is equal to or less than the value of the element in the second row, or when the value of the element in the first row of the sub data is less than 0, or is equal to or less than 0, and the value of the element in the first row is larger than the value of the element in the second row of the sub data, or is equal to or larger than the value of the element in the second row.

* * * * *